(12) United States Patent
Ikuta et al.

(10) Patent No.: US 6,314,703 B1
(45) Date of Patent: Nov. 13, 2001

(54) FASTENER

(75) Inventors: Kazuichi Ikuta; Noritaka Endou, both of Osaka (JP)

(73) Assignee: Wakai & Co., LTD, Osaka (JP)

( * ) Notice: Subject to any disclaimer, the term of this patent is extended or adjusted under 35 U.S.C. 154(b) by 0 days.

(21) Appl. No.: 09/531,776

(22) Filed: Mar. 21, 2000

(30) Foreign Application Priority Data

Mar. 23, 1999 (JP) .................................................. 11-077933

(51) Int. Cl.[7] .................................. E04B 1/38; E04C 5/00
(52) U.S. Cl. ..................................... 52/713; 85/3; 411/342
(58) Field of Search ..................................... 411/340, 342, 411/344, 345, 346

(56) References Cited

U.S. PATENT DOCUMENTS

| 3,211,042 | * | 10/1965 | Fischer | 85/3 |
| 3,513,746 | * | 5/1970 | Forsberg | 85/3 |
| 4,079,655 | * | 3/1978 | Roberson, Jr. | 85/3 |
| 4,616,968 | * | 10/1986 | Giannuzzi | 411/342 |

* cited by examiner

Primary Examiner—Carl D. Friedman
Assistant Examiner—Steve Varner
(74) Attorney, Agent, or Firm—Wenderoth, Lind & Ponack, L.L.P.

(57) ABSTRACT

A fastener can be inserted into a narrow space behind a wall, and can be brought into contact with the back of the wall over a wide area to sufficiently reinforce the wall even when a bolt is tightened to securely fasten an object to the wall. The fastener has a block assembly including a plurality of blocks having two longitudinal ends and coupled together at the longitudinal ends in a single line. One of the blocks is formed with a threaded hole into which a bolt is adapted to be threaded and string holes. At least one string member is passed through the string holes. The block assembly has an arrangement for preventing each block from pivoting in a first direction from a straight position, in which the block assembly is arranged in a straight line, and allowing each block to pivot in a second direction opposite to the first direction from the straight position.

6 Claims, 4 Drawing Sheets

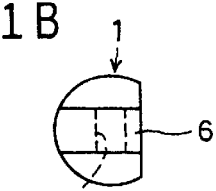
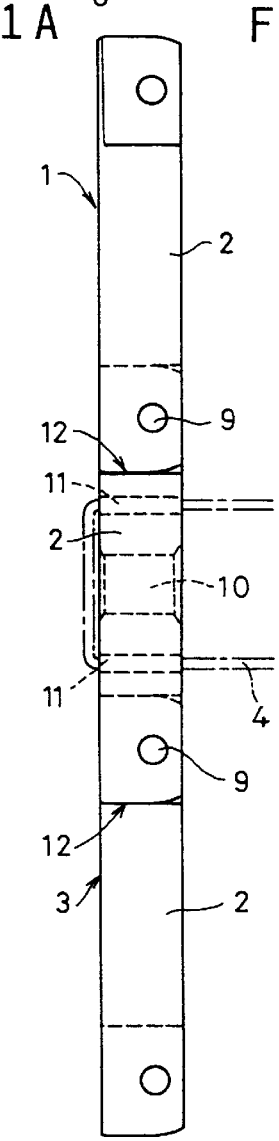
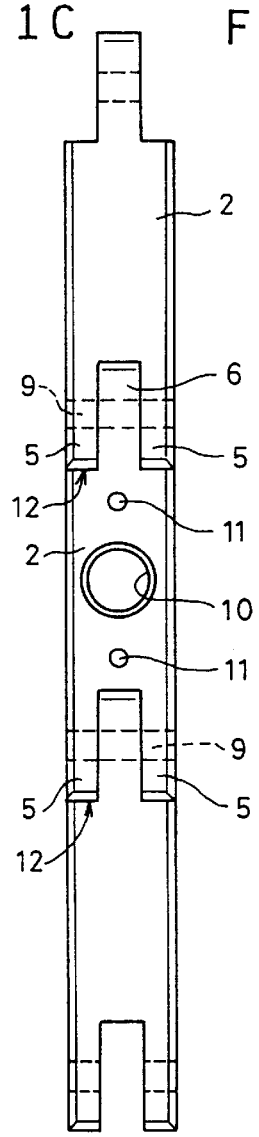
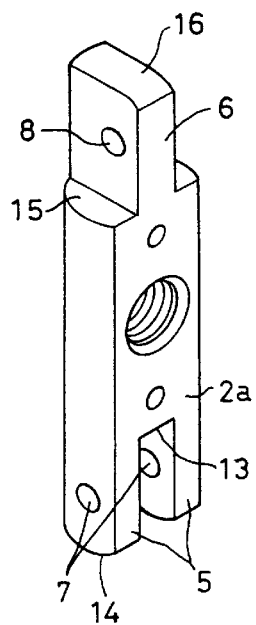
FIG. 1B
FIG. 1A FIG. 1C FIG. 1D

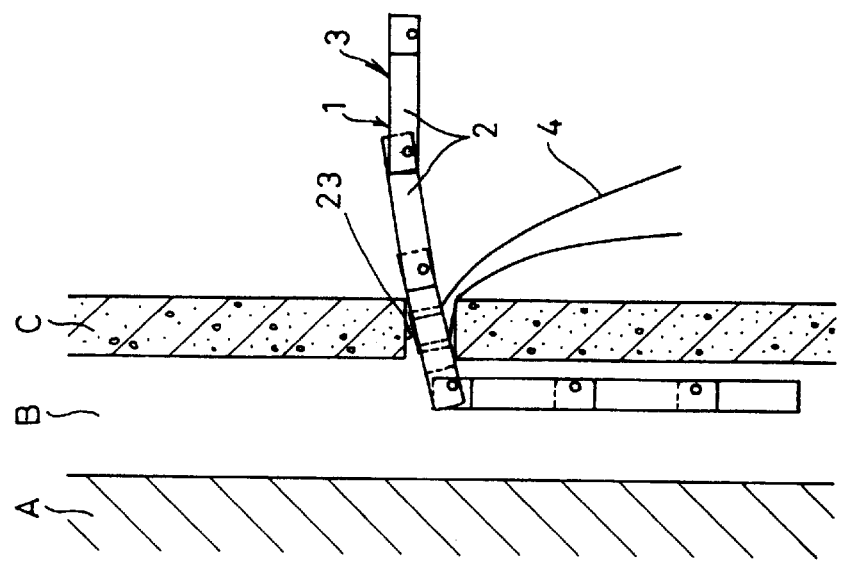
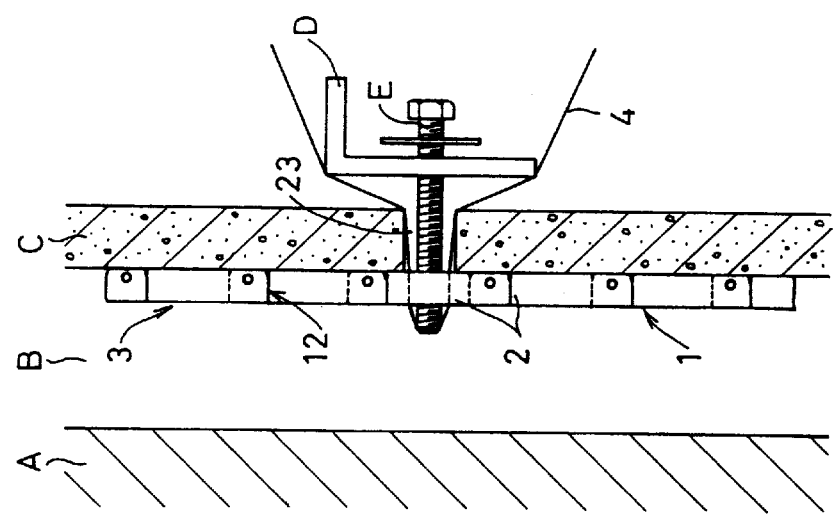
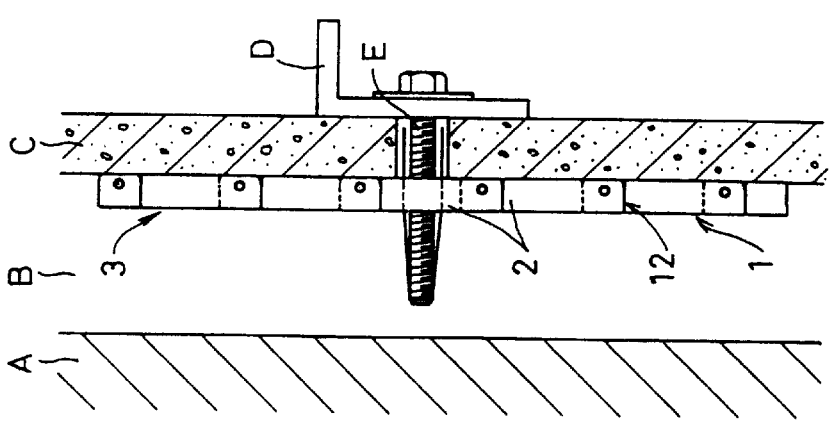

FIG. 3A
FIG. 3B
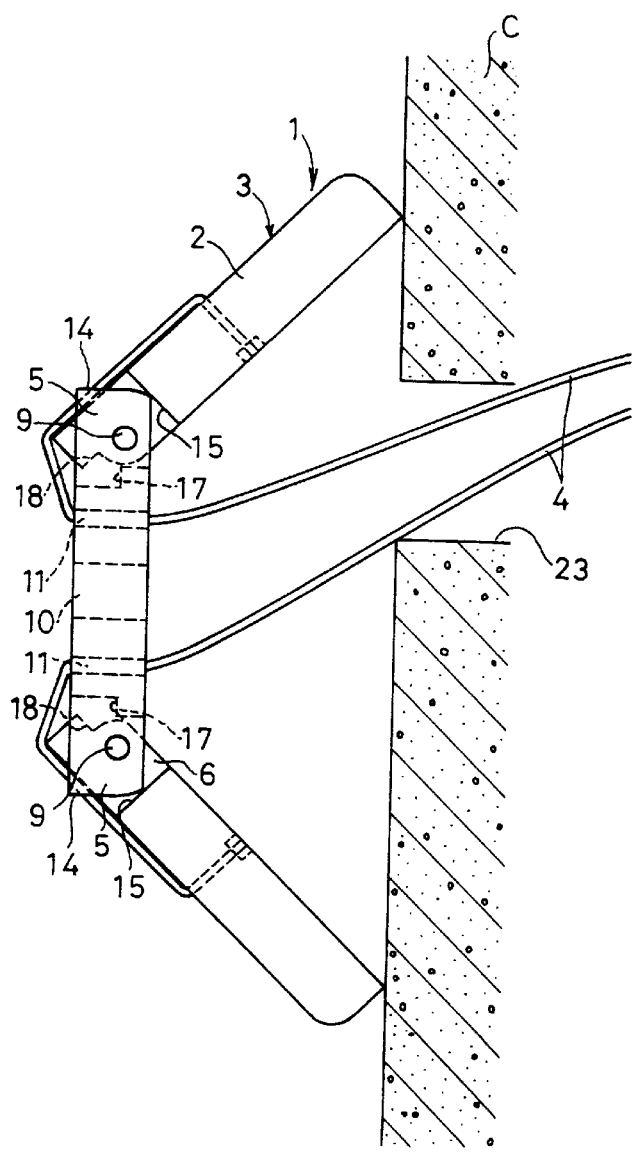
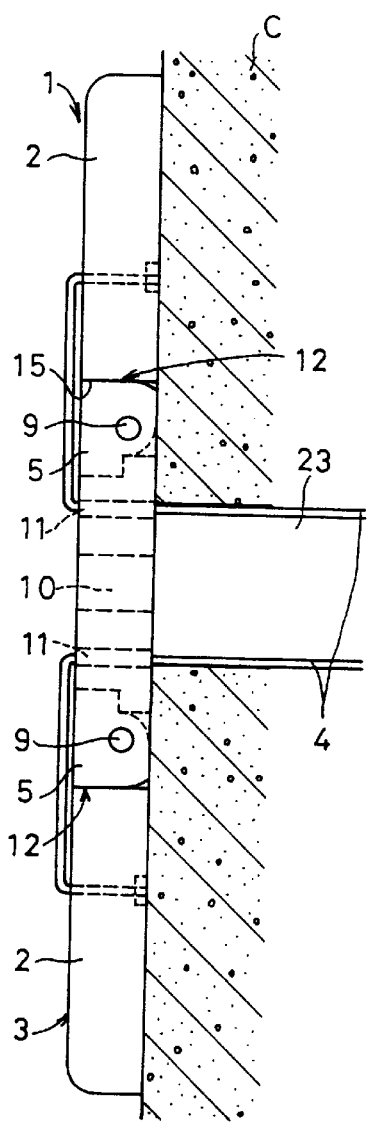

FIG. 4A
FIG. 4B
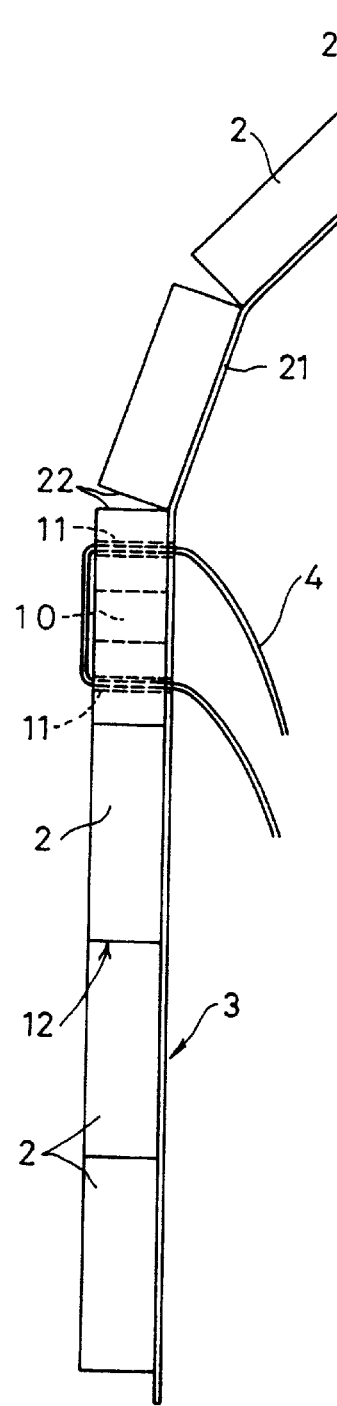
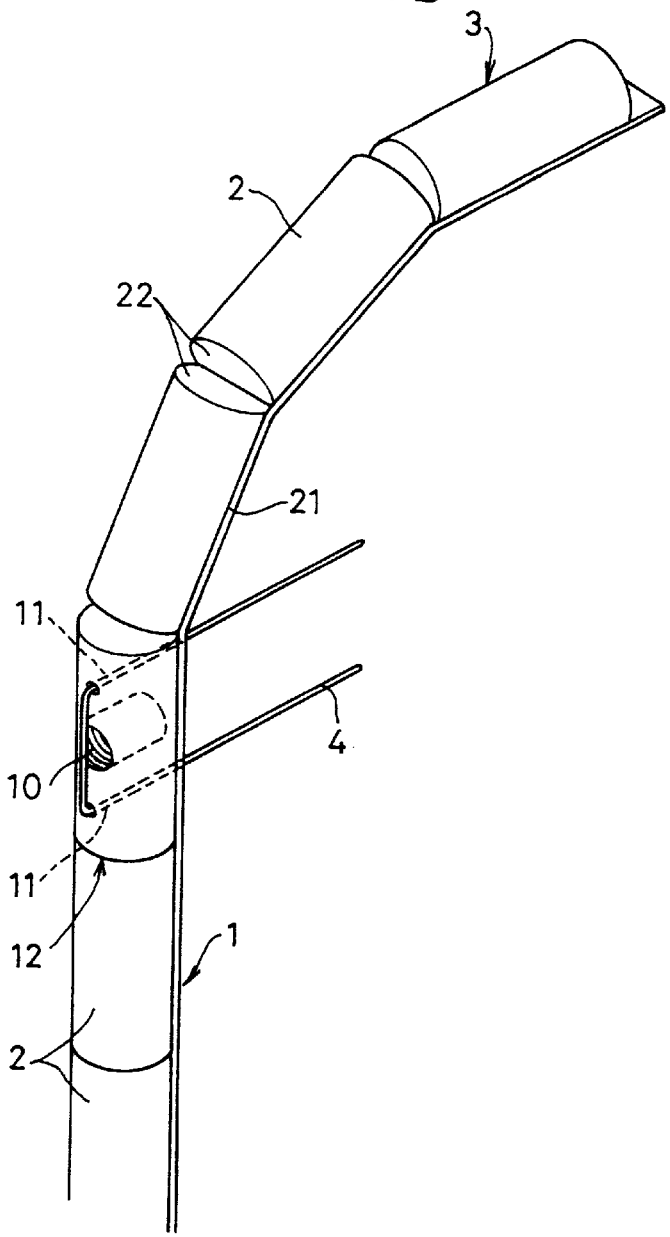

FIGS. 4A and 4B are front and perspective views of a fastener of a third embodiment showing a state when a block assembly is bent.

FASTENER

BACKGROUND OF THE INVENTION

This invention relates to a fastening tool used to fasten an article by means of a bolt to a plasterboard or any other brittle wall whose back is inaccessible.

It is usually impossible to fasten an object to a brittle wall such as a plasterboard by simply driving a nail or screw into the wall because it gets loose in the wall. To prevent loosening of the nail or screw, it is necessary to stick a patch of reinforcing metal on the back of the wall before the wall is erected so that the nail or screw pierced through the wall can be driven into the metal patch. Once the wall is erected, it is impossible to change the position of the metal patch if the space behind the wall is limited and inaccessible. Thus, a nail or screw can be used at the predetermined position only.

In another conventional arrangement, instead of sticking a metal patch on the back of a wall before the wall is erected, a hole is drilled in a wall that has already been erected, and a bolt fastening member is inserted into the space behind the wall. With the fastening member located behind the wall, a bolt is driven through the wall and threaded into the fastening member to securely fasten an object to the wall.

If the space behind the wall is small, only a short fastening member can be inserted into this space. Such a short fastening member is correspondingly small in contact area with the wall, so that it cannot sufficiently reinforce the brittle wall. Thus, by tightening the bolt only slightly, the wall may break.

An object of the invention is to provide a fastener which can be inserted into a narrow space behind a wall, and which can be brought into contact with the back of the wall over a wide contact area to sufficiently reinforce the wall even when a bolt is tightened to fasten an object to the wall.

SUMMARY OF THE INVENTION

According to this invention, there is provided a fastener comprising a block assembly comprising a plurality of blocks having two longitudinal ends and coupled together at said longitudinal ends in a single line, one of said blocks being formed with a threaded hole into which a threaded member is adapted to be threaded and string holes, and at least one string member passed through said string holes, said block assembly having an arrangement for preventing each of said blocks from pivoting in a first direction from a straight position, in which said block assembly is arranged in a straight line, and allowing said each block to pivot in a second direction opposite to said first direction from said straight position.

Other features and objects of the present invention will become apparent from the following description made with reference to the accompanying drawings, in which:

BRIEF DESCRIPTION OF THE DRAWINGS

FIG. 1A is a front view of a fastener of a first embodiment;

FIGS. 1B–1D are plan, side and perspective views thereof;

FIGS. 2A–2C are sectional views of a fastener which is a slight modification of the first embodiment showing how an object is secured to a brittle wall;

FIGS. 3A and 3B are partially cutaway front views of a fastener of a second embodiment, showing a states when a block assembly is bent and when it is straight, respectively; and FIGS. 4A and 4B are front and perspective views of a fastener of a third embodiment showing a state when a block assembly is bent.

DETAILED DESCRIPTION OF THE PREFERRED EMBODIMENTS

FIGS. 1A–1D show a fastener 1 embodying the invention. It comprises a block assembly 3 comprising three blocks 2, and a string 4 joined to the assembly 3. Each block 2 is a substantially cylindrical member having a flat surface 2a, and is formed with bifurcated protrusions 5 at one end and a protrusion 6 at the other end that can be received in the space between the bifurcated protrusions 5 of an adjacent block 2. The bifurcated protrusions 5 and the protrusion 6 have holes 7 and 8, respectively, that are adapted to align transversely with each other when the protrusion 6 is received in the space between the protrusions 5. With the holes 7, 8 aligned, a pin 9 is inserted into the holes so that the adjacent blocks 2 can pivot about the pins 9 toward the flat surface side. The central block 2 is formed with a threaded bolt hole 10 that extends from the flat surface 2a to the other side of the block. String holes 11 are formed parallel to the threaded hole 10 at both sides thereof as shown in FIG. 1C.

If more than three blocks are used, the bolt hole and string holes may be formed in any of the blocks except those at both ends of the assembly. The shape and number of the blocks are not limited.

At the joint portion between the adjacent blocks, the assembly has a means 12 for keeping the assembly in a substantially straight position and allowing each block to pivot in a direction toward the side of the flat surface 2a.

In the embodiment of FIGS. 1A–D, this means 12 comprises substantially flat surfaces 13, 14, 15, 16 formed, respectively, on the bottom of the space between the bifurcated protrusions 5, on the ends of the protrusions 5, on both sides of the protrusion 6 at its root, and on the end of the protrusion 6 so as to extend transversely with respect to the longitudinal direction of the blocks. These surfaces are arranged such that when the adjacent blocks 2 are coupled together by the pin 9 so that the assembly 3 is in the straight position, the surfaces 14 and 15, and the surfaces 13 and 16 abut each other. The surfaces 13 and 15 are completely flat surfaces. But the surfaces 14 and 16 have an arcuately curved portion having a center at the pin 9 and connecting with the surface 2a so that each block can pivot toward the surface 2a from the straight position of the assembly. But since the surfaces are otherwise flat, the blocks cannot pivot in the opposite direction from the straight position of the assembly.

FIGS. 3A and 3B show a different example of such means which comprises a longitudinal ledge 17 formed on one of the adjacent blocks 2 and a protrusion 18 formed on the other and adapted to abut the ledge 17 when the blocks are in their straight position. In any of the arrangements, this means should preferably be arranged such that when the surfaces 14 and 15 and the surfaces 13 and 16, or the ledge 17 and the protrusion 18 abut each other, the assembly is slightly arched such that the surfaces 2a form a very shallow concave surface on the whole. With this arrangement, when a bolt is threaded into the bolt hole 10 and tightened, the assembly is completely straightened without deflecting in the opposite direction.

In the embodiment of FIGS. 1A–D, a single string 4 is inserted into one of the string holes from the surface 2a, passed to the other side, inserted into the other string hole from the other side, and passed to the surface 2a. In the embodiment of FIGS. 3A and 3B, two strings are passed through the respective string holes 11 with one end that protrudes from the other side of the string hole fixed.

Instead of a string or strings, a belt or belts may be used. To prevent the string from moving in the string holes, fine protrusions may be formed thereon, or washers may be used.

The block assembly may be provided with a biasing means for biasing the assembly to return it to the straight position. This means may comprise coil springs each mounted on one of the pins 9 with one end engaging the flat surface 2a of one of the adjacent blocks 2 and the other end engaging the flat surface 2a of the other. It may also comprise leaf springs each mounted to straddle the flat surfaces 2a of the adjacent blocks 2 and coupled to one of the adjacent blocks.

FIGS. 3A and 3B show an arrangement that needs no such biasing means to keep the assembly in the straight position. In this arrangement, two strings 4 have their first ends thereof fixed to the blocks at both ends of the assembly, are passed over the backs of the blocks, and inserted into the string holes 11 from the back of the central block and passed out of the holes to the surface 2a. By pulling the strings with both ends of the assembly abutting the back of the wall C (FIG. 3A), the blocks at both ends are pivoted about the pins 9 until the assembly is straightened as shown in FIG. 3B.

If the block assembly comprises more than three blocks, the strings ends are fixed to the blocks at both ends of the assembly, passed over the backs of all the blocks forming the assembly, inserted into the string holes from the back of the block formed with the string holes and passed out of the holes to the surface 2a. By pulling the strings in this state, the assembly will be straightened in the same manner as the assembly of FIGS. 3A and 3B.

In the embodiment of FIGS. 4A and 4B, the block assembly comprises a plurality of substantially semicylindrical blocks having longitudinal flat surfaces and coupled together by a bendable plate member 21 of a metal or synthetic resin sheet joined to the flat surfaces. The means 12 comprises flat surfaces 22 formed at both ends of each block. The flat surfaces 22 abut each other when the assembly is straightened, thus allowing the blocks 2 to bend toward the plate member 21 but preventing them from pivoting in a direction away from the plate member 21 beyond the straight position.

A threaded hole 10 and string holes 11 are formed in the central block 2 in exactly the same way as in the embodiment of FIGS. 1A–D and a string 4 is passed through the holes 11 in exactly the same manner as in the embodiment of FIGS. 1A–D.

FIGS. 2A to 2C show how a fastener having the same structure as the fastener of FIGS. 1A–D except that the assembly comprises more than three, i.e. five blocks is used to fasten an object D to a brittle wall C such as a plasterboard by means of a bolt E. The wall C is erected with a narrow space B left between the wall A of a building and the wall C.

First, in order to insert the block assembly into this space, a hole 23 is drilled in the wall C. Then, the assembly is inserted into the space B though the hole 23 with the string 4 attached thereto as shown in FIG. 2A.

Since the assembly is freely bendable in one direction, it can be easily inserted into the narrow space B through the small hole 23 as shown in FIG. 2A. To prevent the string 4 from falling into the space B through the hole 23, a ring or a plate larger than the hole 23 may be attached to the string ends.

When the entire block assembly has been inserted into the space B with only the string ends protruding from the front side of the wall C, the assembly is substantially straightened. Then, by pulling the string, the assembly is pulled up along the back of the wall C (FIG. 2B) until the assembly is completely straightened with the flat surfaces 2a pressed closely against the back of the wall C and the threaded hole 10 in alignment with the hole 23.

When the strings 4 are pulled, the flat surfaces 2a of the blocks 2 will face to the back of the wall C and abut thereto. Now the block assembly 3 is in its straight position and serves as a bearing having a sufficient contact area with the back of the wall C for stable support.

By providing the biasing means such as comprising the abovementioned coil springs or leaf spring, the assembly is straightened when it hangs in the space.

In the arrangement of FIGS. 3A and B, the strings 4 straighten the assembly when they are pulled.

In the arrangement of FIGS. 4A and 4B, the assembly is straightened when the flat surfaces are pressed closely against the wall as in the arrangement of FIGS. 1A–D.

In any of the arrangements, with the assembly pressed against the back of the wall C as shown in FIG. 2B, a bolt E is inserted through the object D and the hole 23 and threaded into the threaded hole 10 of the central block 2. The object D can thus be securely fastened to the wall C. The string is then removed by cutting its portion protruding from the front side of the wall.

What is claimed is:

1. A fastener for fastening an object to a wall surface, said fastener comprising a block assembly comprising a plurality of blocks having two ends and coupled together end-to-end in a single line, one of said blocks being formed with a threaded bolt hole and string holes near said bolt hole, and at least one string member passed through said string holes, said block assembly having an arrangement for preventing each of said blocks from pivoting in a first direction from a straight position, in which said block assembly is arranged in a straight line, and allowing each block to pivot in a second direction opposite to said first direction from said straight position.

2. The fastener as claimed in claim 1 wherein said blocks have longitudinal protrusions having transverse holes formed therein, and are coupled together by a pin inserted through said transverse holes so as to be pivotable about said pin in said second direction, said arrangement comprising abutment surfaces formed at said ends of said blocks to prevent each of said blocks from pivoting about said pin in said first direction from the straight position, while allowing each of said blocks to pivot in said second direction about said pin.

3. The fastener as claimed in claim 1 wherein said string holes and said threaded bolt hole are formed in one block other than the blocks at both ends of the block assembly, and wherein two string members are passed through the respective string holes and have first ends thereof protruding from first ends of said string holes in said first direction and secured to the blocks at both ends of said block assembly, and second ends protruding from the other ends of said string holes, whereby said block assembly can be straightened by pulling the second ends of the strings.

4. The fastener as claimed in claim 1 further comprising elastic members for biasing said blocks in said first direction.

5. The fastener as claimed in claim 2 wherein said string holes and said threaded bolt holes are formed in one block other than the blocks at both ends of the block assembly, and wherein two string members are passed through the respective string holes and have first ends thereof protruding from first ends of said string holes in said first direction and secured to the blocks at both ends of said block assembly, and second ends protruding from the other ends of said string holes, whereby said block assembly can be straightened by pulling the second ends of the strings.

6. The fastener as claimed in claim 2 further comprising elastic members for biasing said blocks in said first direction.

* * * * *